(12) United States Patent
Cha et al.

(10) Patent No.: US 12,183,953 B2
(45) Date of Patent: Dec. 31, 2024

(54) LENGTH-ADJUSTABLE INTER-BUS BAR

(71) Applicant: LG Energy Solution, Ltd., Seoul (KR)

(72) Inventors: Jae-Hyuk Cha, Daejeon (KR); Sung-Tack Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 573 days.

(21) Appl. No.: 17/600,170

(22) PCT Filed: Aug. 4, 2020

(86) PCT No.: PCT/KR2020/010281
§ 371 (c)(1),
(2) Date: Sep. 30, 2021

(87) PCT Pub. No.: WO2021/045395
PCT Pub. Date: Mar. 11, 2021

(65) Prior Publication Data
US 2022/0158309 A1 May 19, 2022

(30) Foreign Application Priority Data
Sep. 3, 2019 (KR) .......................... 10-2019-0108862

(51) Int. Cl.
*H01M 50/507* (2021.01)
*H01M 50/517* (2021.01)
*H01R 25/16* (2006.01)

(52) U.S. Cl.
CPC ....... *H01M 50/507* (2021.01); *H01M 50/517* (2021.01); *H01R 25/162* (2013.01)

(58) Field of Classification Search
CPC ............. H01M 50/507; H01M 50/517; H01M 50/502; H01M 50/50; H01R 25/162; H01R 4/34; H01R 9/24; H01R 9/2458
See application file for complete search history.

(56) References Cited

U.S. PATENT DOCUMENTS

| 9,590,405 B1 | 3/2017 | Maurer et al. |
| 2011/0097607 A1 | 4/2011 | Park et al. |

(Continued)

FOREIGN PATENT DOCUMENTS

| CN | 204504193 U | 7/2015 |
| CN | 205215014 U | 5/2016 |

(Continued)

OTHER PUBLICATIONS

Hiroyuki et al., JP 2015-005473 Espacenet machine translation, 2015 (Year: 2015).*

(Continued)

*Primary Examiner* — Adam A Arciero
(74) *Attorney, Agent, or Firm* — Lerner David LLP (57) ABSTRACT

An inter-bus bar including a first bus bar including a first body region having a fastening hole formed at one end and a first length adjusting region configured to extend by a predetermined length from the other end, and a second bus bar including a second body region having a fastening hole formed at one end and a second length adjusting region configured to extend by a predetermined length from the other end, the second bus bar being configured to be coupled to or released from the first bus bar, the first length adjusting region and the second length adjusting region forming a connection portion where they are at least partially overlapped, and the first length adjusting region and the second length adjusting region being removably coupled to each other at different relative positions to change the length of the connection portion.

11 Claims, 11 Drawing Sheets

(56) References Cited

U.S. PATENT DOCUMENTS

| | | |
|---|---|---|
| 2017/0201080 A1 | 7/2017 | Maurer et al. |
| 2018/0331345 A1 | 11/2018 | Lim et al. |
| 2019/0355947 A1 | 11/2019 | Chi et al. |
| 2020/0169069 A1 | 5/2020 | Hiramitsu et al. |
| 2020/0350547 A1 | 11/2020 | Chi et al. |

FOREIGN PATENT DOCUMENTS

| | | | |
|---|---|---|---|
| CN | 205215077 U | | 5/2016 |
| CN | 205846252 U | | 12/2016 |
| CN | 106961058 A | | 7/2017 |
| CN | 206834244 U | | 1/2018 |
| CN | 206834245 U | | 1/2018 |
| CN | 108496287 A | | 9/2018 |
| CN | 108878696 A | | 11/2018 |
| CN | 109390518 A | | 2/2019 |
| GB | 853432 A | | 11/1960 |
| IN | 203503729 U | | 3/2014 |
| JP | 200077111 A | | 3/2000 |
| JP | 2013105522 A | | 5/2013 |
| JP | 20155473 A | | 1/2015 |
| JP | 6098444 B2 | | 3/2017 |
| JP | 2017135846 A | | 8/2017 |
| KR | 200307241 Y1 | | 3/2003 |
| KR | 20100013759 A | | 2/2010 |
| KR | 20110045235 A | | 5/2011 |
| KR | 20160056080 A | * | 11/2014 |
| KR | 20170021697 A | | 2/2017 |
| KR | 20170121876 A | | 11/2017 |
| KR | 20190009120 A | | 1/2019 |
| KR | 20190040402 A | | 4/2019 |
| WO | 2017130733 A1 | | 8/2017 |
| WO | 2019031702 A1 | | 2/2019 |

OTHER PUBLICATIONS

Saito et al., JP 2000-0077111 Espacenet machine translation, 2000 (Year: 2000).*

Jeong et al., KR 2016-0056080 Espacenet machine translation, 2016 (Year: 2016).*

Extended European Search Report including Written Opinion for Application No. 20860903.2 dated Oct. 28, 2022, pp. 1-8.

International Search Report for Application No. PCT/KR2020/010281 mailed Nov. 23, 2020, pp. 1-3.

Search Report dated Dec. 28, 2022 from the Office Action for Chinese Application No. 202080032025.3 issued Jan. 5, 2023, 3 pages. [See p. 2, categorizing the cited references].

* cited by examiner

LENGTH-ADJUSTABLE INTER-BUS BAR

CROSS-REFERENCE TO RELATED APPLICATIONS

The present application is a national phase entry under 35 U.S.C. § 371 of International Application No. PCT/KR2020/010281 filed Aug. 4, 2020, published in Korean, which claims priority from Korean Patent Application No. 10-2019-0108862 filed Sep. 3, 2019, all of which are incorporated herein by reference.

TECHNICAL FIELD

The present disclosure relates to an inter-bus bar, more particularly, to an inter-bus bar whose length is easily adjustable depending on an installation spot.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

Recently, secondary batteries are widely used not only in small devices such as portable electronic devices but also in middle-sized or large-sized devices such as vehicles and energy storage systems (ESS). When used in such a medium-sized or large-sized device, a large number of secondary batteries are electrically connected to form a battery module or a battery pack in order to increase capacity and output.

A bus bar is widely used as an electrical connection means for high current connection of a battery module or a battery pack. The bus bar is generally made of copper or aluminum and is manufactured in the form of a rigid plate having certain width, thickness and length. The bus bar has excellent electrical conductivity, which secures less energy loss and are safer for high-current conduction in comparison to ordinary cables.

Figure 1:
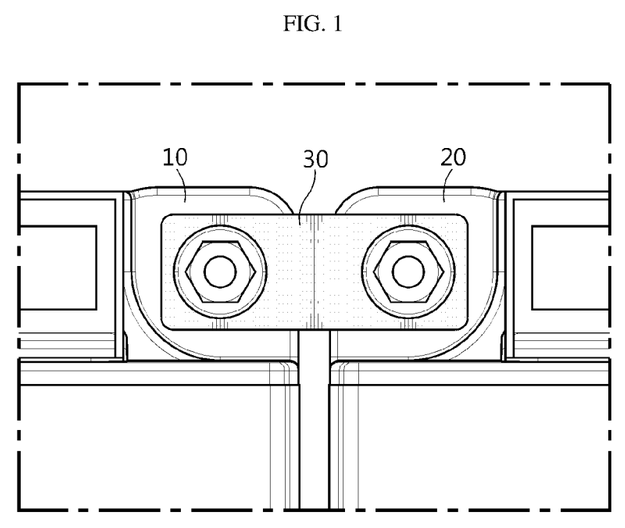
FIG. 1 is a reference view for illustrating an example where a conventional inter-bus bar is used.

Meanwhile, among bus bars, a bus bar used for connecting battery modules is referred to as an inter-bus bar. For example, as shown in FIG. 1, two adjacent battery modules 10, 20 may be connected in series through an inter-bus bar 30. In other words, a positive electrode terminal of one battery module 10 and a negative electrode terminal of the other battery module 20 may be electrically connected through the inter-bus bar 30. In this pattern, a plurality of battery modules are connected in series to form a high-output battery pack.

However, since battery packs have differences in internal components or internal buffering materials depending on models, the distances between the battery modules may be slightly different, so inter-bus bars are manufactured with different lengths for each battery pack model. For example, even if the distance between battery modules is changed by only 5 mm, a new inter-bus bar should be manufactured.

Accordingly, there is a demand to develop a length-adjustable inter-bus bar capable of connecting battery modules even if the distance between battery modules varies depending on battery pack models.

SUMMARY

Technical Problem

The present disclosure is directed to providing a length-adjustable inter-bus bar, which may easily connect battery modules regardless of the distance between the battery modules.

Other objects and advantages of the present disclosure will be described below, and will be appreciated by embodiments of the present disclosure. In addition, the objects and advantages of the present disclosure can be realized by components defined in the claims and a combination thereof.

Technical Solution

In one aspect of the present disclosure, there is provided an inter-bus bar, comprising: a first bus bar including a first body region including a first fastening hole positioned at a first end of the first body region and a first length adjusting region extending along a first axis out from a second end of the first body region by a first predetermined length; and a second bus bar including a second body region including a second fastening hole formed at a first end of the second busbar and a second length adjusting region extending along the first axis out from a second end of the second body region by a second predetermined length, the second bus bar being removably couplable to the first bus bar, wherein the first length adjusting region and the second length adjusting region are configured to be removably coupled to each other at different relative positions, wherein the first length adjusting region and the second length adjusting region are at least partially overlapped with each other when coupled, and wherein a length of the partial overlap between the first length adjusting region and the second length adjusting region is adjustable. The inter-bus bar is configured to electrically connect two adjacent battery modules to each other.

A thickness of the first length adjusting region may be smaller than a thickness of the first body region, and a thickness of the second length adjusting region may be smaller than a thickness of the second body region, and a sum of the thicknesses of the first length adjusting region and the second length adjusting region may be equal to at least one of the thickness of the first body region or the thickness of the second body region.

The first length adjusting region and the second length adjusting region may form a symmetric structure when coupled.

The first length adjusting region may include: a plurality of first holes formed through the first length adjusting region at predetermined intervals along the first axis; and a first fitting button. The second length adjusting region may include: a plurality of second holes formed through the second length adjusting region; and a second fitting button, wherein the first fitting button is adapted to fit into any one of the second plurality of holes, and wherein the second fitting button is adapted to fit into any one of the first plurality of holes.

The first length adjusting region may include a plurality of holes positioned at predetermined intervals along the first axis, and the second length adjusting region may include a plurality of depressions at positions corresponding to the plurality of holes in the first length adjusting region and depressed to a predetermined depth from a surface of the second length adjusting region, each of the depressions including a threaded inner circumference.

The plurality of holes in the first length adjusting region may have a first diameter adapted to fit a screw head of a screw, and the plurality of depressions in the second length adjusting region have a second diameter adapted to fit a threaded portion of the screw.

The first length adjusting region and the first body region may be equal in thickness, and the first length adjusting region may include one or more insert grooves depressed to a predetermined depth along the first axis from an end of the first length adjusting region toward the first body region, and the second length adjusting region may include one or more extensions extending from the second body region along the first axis for a length corresponding to the predetermined depth of the insert groove, and the extension may be adapted to be removably inserted into the insert groove.

The first length adjusting region may include a plurality of insert grooves aligned along a width direction of the first length adjusting region, and the second length adjusting region may include a plurality of extensions, each extension being a rod adapted to be removably inserted into a respective one of the plurality of insert grooves.

In another aspect of the present disclosure, there is also provided a bus bar assembly, comprising: an inter-bus bar as described in any of the embodiments herein; and an insulation cover configured to surround and cover the inter-bus bar.

The insulation cover may include: a first terminal cover configured to removably cover the fastening hole of the first bus bar and a second terminal cover configured to removably cover the fastening hole of the second bus bar; and a middle cover portion including a first end coupled to the first terminal cover and a second end coupled to the second terminal cover, the middle cover portion is an accordion tube.

In still another aspect of the present disclosure, there is also provided a battery pack, comprising: an inter-bus bar as described in any of the embodiments herein; and two adjacent battery modules electrically connected by the inter-bus bar.

Advantageous Effects

According to an embodiment of the present disclosure, it is possible to provide a length-adjustable inter-bus bar, which may easily connect battery modules regardless of the distance between the battery modules.

That is, even if the distances between battery modules are different, it is possible to connect the battery modules using the inter-bus bar. Therefore, the inter-bus bar may be used with compatibility for battery packs with different specifications, so there is no need to manufacture inter-bus bars of various lengths.

The effects of the present disclosure are not limited to the above, and effects not mentioned herein may be clearly understood from the present specification and the accompanying drawings by those skilled in the art.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

Figure 2:
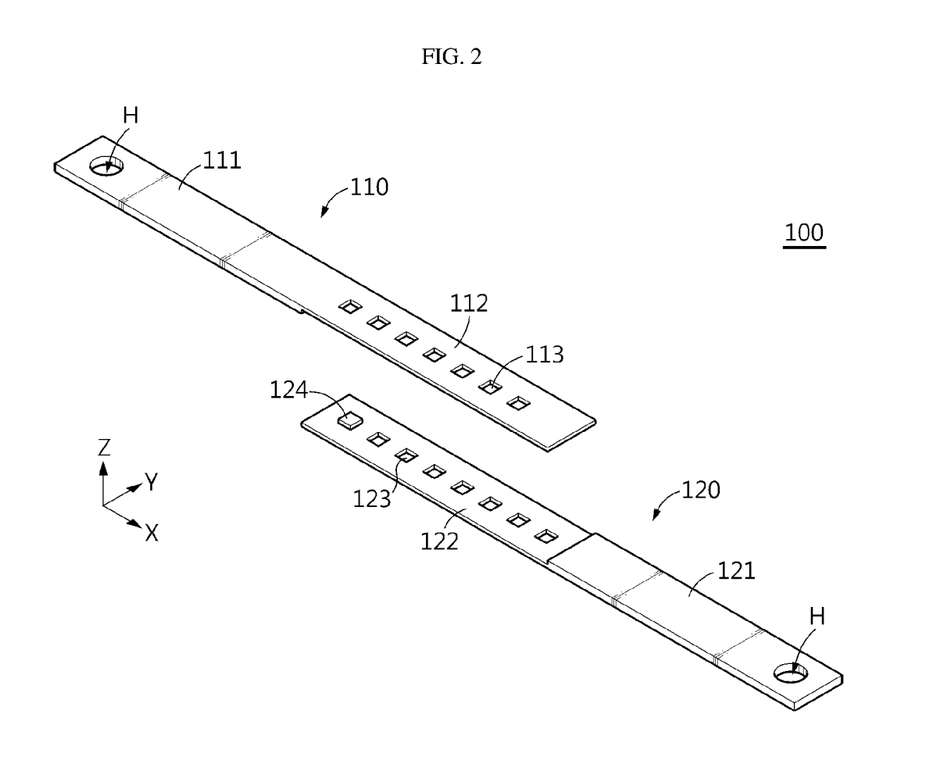
FIG. 2 is an exploded perspective view showing an inter-bus bar according to the first embodiment of the present disclosure.
Figure 3:
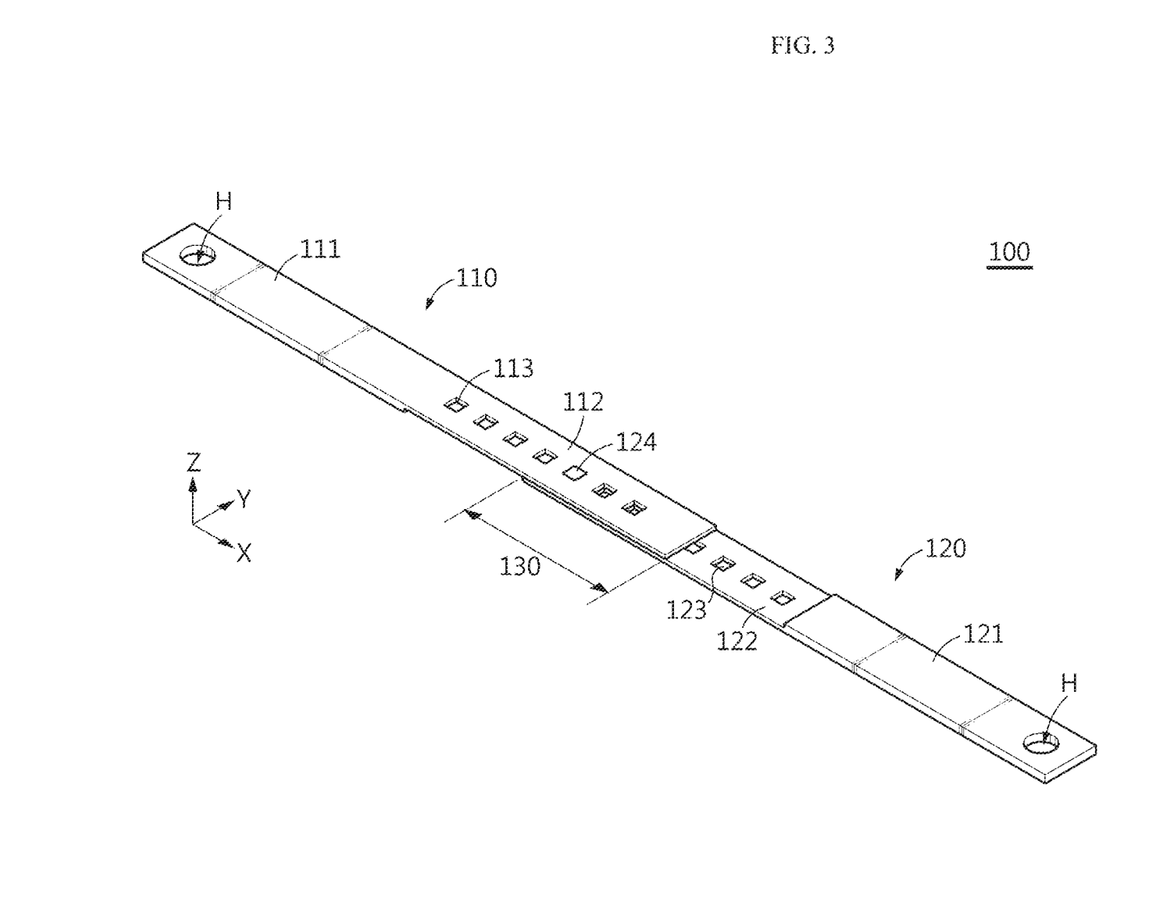
FIG. 3 is an assembled perspective view showing the inter-bus bar of FIG. 2.

FIG. 2 is an exploded perspective view showing an inter-bus bar according to the first embodiment of the present disclosure, and FIG. 3 is an assembled perspective view showing the inter-bus bar of FIG. 2.

Referring to these drawings, an inter-bus bar 100 according to the first embodiment of the present disclosure includes a first bus bar 110 and a second bus bar 120 that may be coupled to and released from the first bus bar 110.

As will be described later, the total length of the inter-bus bar 100 according to the present disclosure may be variously adjusted according to a coupling position of the first bus bar 110 and the second bus bar 120, which may be compatible to connect battery modules with different relative distances. In addition, battery modules mounted inside the battery pack of the same model may have different relative distances therebetween due to assembly deviation or the like. Even in this case, the inter-bus bar 100 according to the present disclosure may be used regardless of the relative distance deviation between battery modules, which may be regarded as being very useful.

Hereinafter, the configuration of the inter-bus bar 100 according to the first embodiment of the present disclosure having the above characteristics will be described in detail.

The first bus bar 110 and the second bus bar 120 may be made of, for example, copper or aluminum, and its dimensions such as width, thickness and length may be determined according to a maximum allowable current of the inter-bus bar 100.

The first bus bar 110 includes a first body region 111 and a first length adjusting region 112 respectively having a predetermined length.

The first body region 111 is a portion that contacts a terminal of one battery module and has a fastening hole H formed at one end thereof. The fastening hole H may be used for inserting a bolt therein to fix the first body region 111 to the terminal (not shown) of the battery module.

The first length adjusting region 112 is a portion used to adjust the length of the inter-bus bar 100, and may extend by a predetermined length from the other end of the first body region 111 and have a smaller thickness than the first body region 111. Accordingly, the first bus bar 110 has a step.

The second bus bar 120 includes a second body region 121 and a second length adjusting region 122 respectively having a predetermined length, similar to the first bus bar 110.

The second body region 121 is a portion that contacts a terminal of the other battery module, and has a fastening hole H formed at one end thereof, like the first body region 111.

The second length adjusting region 122 may extend from the other end of the second body region 121 by a predetermined length and have a smaller thickness than the second body region 121. Therefore, like the first bus bar 110, the second bus bar 120 also has a step.

The sum of the thicknesses of the first length adjusting region 112 and the second length adjusting region 122 is preferably equal to the thickness of the first body region 111 or the second body region 121. As a result, after the first bus bar 110 and the second bus bar 120 are coupled, the thickness of the inter-bus bar 100 is generally kept constant, thereby preventing the inter-bus bar 100 from being inclined or lifted in any side.

Based on the center of the inter-bus bar 100, the first body region 111 and the second body region 121 have a symmetrical structure, and the first length adjusting region 112 and the second length adjusting region 122 may also have a symmetrical structure.

In particular, as shown in FIGS. 2 and 3, the first length adjusting region 112 and the second length adjusting region 122 form a connection portion 130 where the first length adjusting region 112 and the second length adjusting region 122 are at least partially overlapped with each other. The entirely length of the inter-bus bar 100 may be adjusted by adjusting the relative overlapping range of the first length adjusting region 112 and the second length adjusting region 122, namely the length of the connection portion 130 and attaching and detaching the first bus bar 110 and the second bus bar 120.

To this end, the first length adjusting region 112 and the second length adjusting region 122 according to the first embodiment of the present disclosure respectively have a plurality of keyholes 113, 123 formed therethrough at predetermined intervals along a length direction thereof and a fitting button 124 formed at one side thereof to protrude so as to be inserted into any one of the keyholes 113, 123.

The keyholes 113, 123 may have a rectangular parallelepiped hole shape, and the fitting button 124 may also have a rectangular parallelepiped shape to correspond to the keyholes 113, 123. In addition, it is preferable that one fitting button 124 is provided at the end of each of the first length adjusting region 112 and the second length adjusting region 122.

As shown in FIG. 3, in the first bus bar 110 and the second bus bar 120, the fitting button (not shown) of the first length adjusting region 112 is fitted into one of the keyholes 123 of the second length adjusting region 122, and the fitting button 124 of the second length adjusting region 122 is fitted into one of the keyholes 113 of the first length adjusting region 112, thereby forming the inter-bus bar 100.

In this embodiment, the inter-bus bar 100 is configured such that the fitting button (not shown) of the first length adjusting region 112 and the fitting button 124 of the second length adjusting region 122 are symmetrically fitted into the counterpart keyholes 113, 123. Therefore, the inter-bus bar 100 may be fixed without moving at least in front, rear, left and right directions (X-Y plane) after being coupled. In addition, the combination of the rectangular parallelepiped keyholes 113, 123 and the fitting button 124 may be advantageous to eliminate minute twisting.

Though not shown in the figures, the inter-bus bar 100 may also be fixed in upper and lower directions (Z-axis direction) since the first body region 111 and the second body region 121 are fastened to the terminals of the battery module through the fastening holes H, respectively.

Meanwhile, when it is necessary to adjust the length of the inter-bus bar 100 shown in FIG. 3 longer, the first bus bar 110 and the second bus bar 120 are separated, and then the fitting button (not shown) of the first length adjusting region 112 and the fitting button 124 of the second length adjusting region 122 are fitted into the second keyhole 123 from the end of the second length adjusting region 122 and the second keyhole 113 from the end of the first length adjusting region 112, respectively.

For example, if the distance between the keyholes 113, 123 is set to 5 mm, the length of the inter-bus bar 100 may be adjusted in the unit of 5 mm. Of course, it is possible to adjust the length of the inter-bus bar to be smaller or larger than 5 mm by setting the interval between the keyholes 113, 123 to be smaller or larger than 5 mm.

Next, an inter-bus bar 100A according to the second embodiment of the present disclosure will be described.

Figure 4:
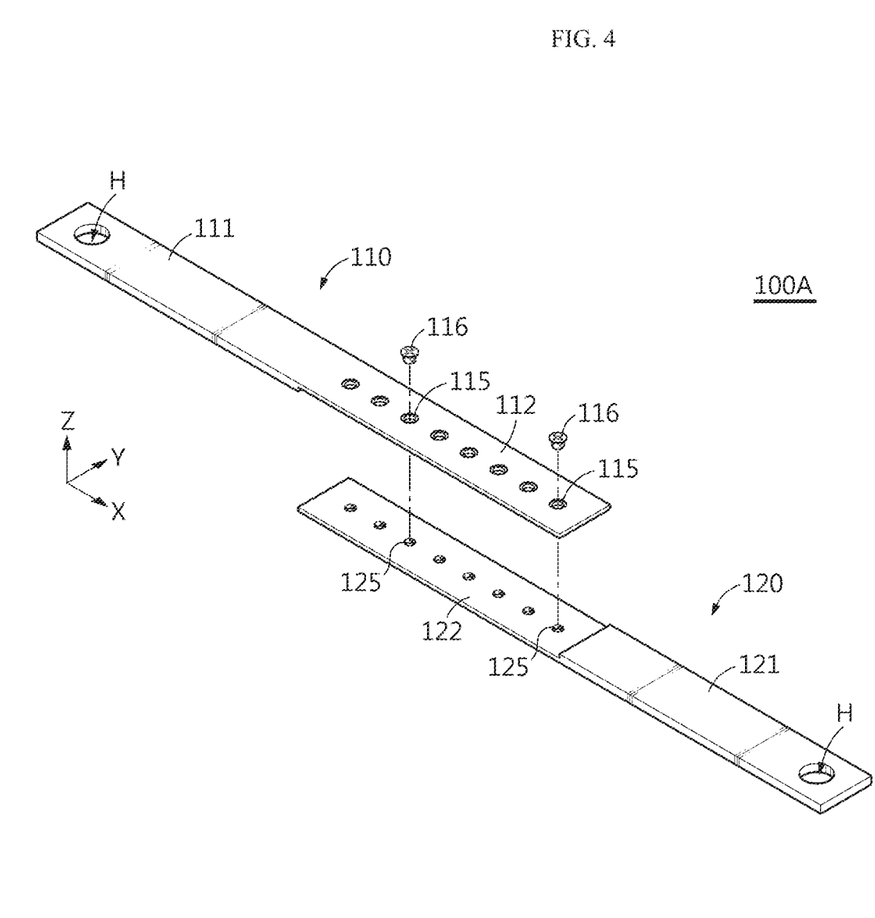
FIG. 4 is an exploded perspective view showing an inter-bus bar according to the second embodiment of the present disclosure.
Figure 5:
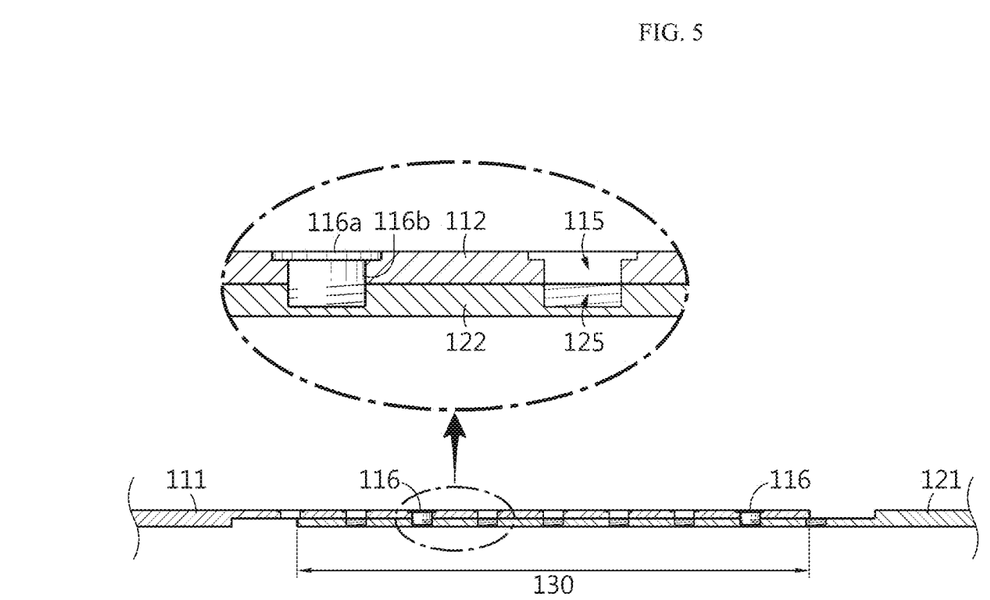
FIG. 5 is a sectional view showing a main part of the inter-bus bar according to the second embodiment of the present disclosure.
Figure 6:
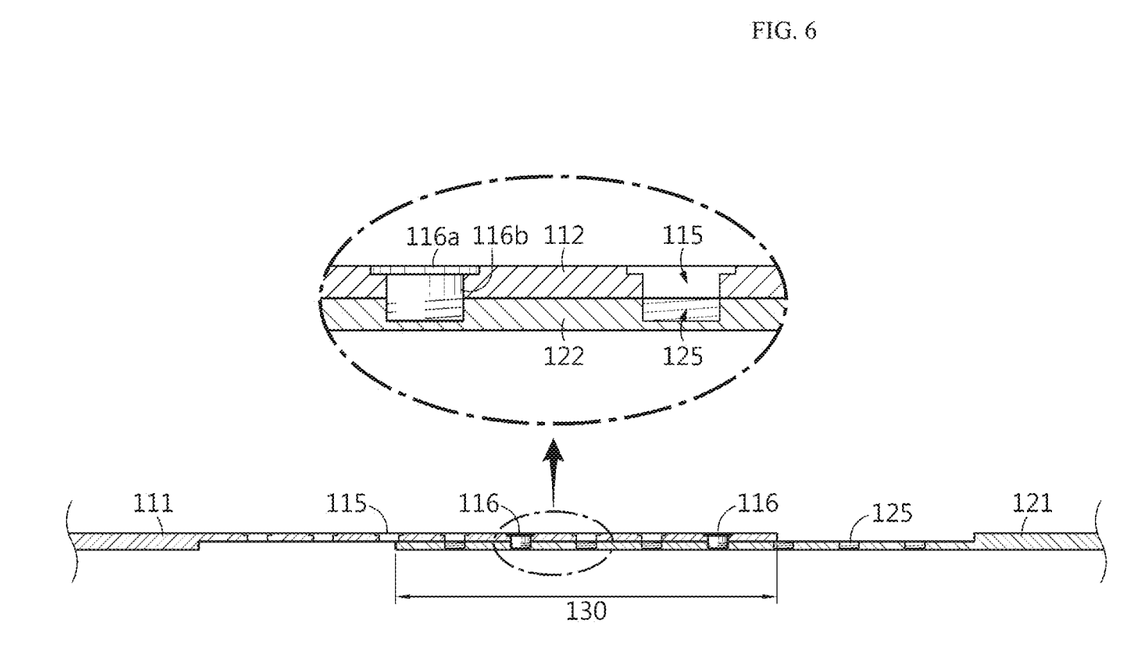
FIG. 6 is a sectional view corresponding to FIG. 5 and showing a main part of the inter-bus bar whose length is adjusted.

FIG. 4 is an exploded perspective view showing an inter-bus bar 100A according to the second embodiment of the present disclosure, FIG. 5 is a sectional view showing a main part of the inter-bus bar 100A according to the second embodiment of the present disclosure, and FIG. 6 is a sectional view corresponding to FIG. 5 and showing a main part of the inter-bus bar 100A whose length is adjusted.

The inter-bus bar 100A according to the second embodiment of the present disclosure will be described with reference to the drawings. The same reference numerals denote the same components, the same components will not be described again, and features different from the former embodiment will be described in detail.

Referring to FIGS. 4 and 5, the first length adjusting region 112 according to the second embodiment of the present disclosure has a plurality of screwing holes 115 formed therethrough at predetermined intervals along the length direction so that a screw 116 may be inserted therein, and the second length adjusting region 122 has screwing grooves 125 provided at positions corresponding to the screwing holes 115 and depressed to a predetermined depth from the surface thereof. The screwing grooves 125 have a thread formed on an inner circumference thereof.

As shown in FIG. 5, the first bus bar 110 and the second bus bar 120 may be firmly coupled by tightening the screw 116 in at least one of the places where the screwing hole 115 of the first length adjusting region 112 and the screwing groove 125 of the second length adjusting region 122 are aligned vertically. At this time, in this embodiment, two screws 116 are used, but one screw or three or more screws may also be used.

In the inter-bus bar 100 according to the first embodiment described above, since the connection portion 130 is maintained by fitting the fitting button 124 into the keyholes 113, 123, the fixing is somewhat weak in the vertical (Z-axis) direction. Meanwhile, in the inter-bus bar 100A according to the second embodiment, since the connection portion 130 is maintained by the screw fastening as above, movement of the first bus bar 110 and the second bus bar 120 in upper, lower, left, right, front and rear directions may be prevented more securely, compared to the first embodiment.

The screwing hole 115 according to the second embodiment may be formed to have dual diameters so that a screw head 116a may be completely inserted into the first length adjusting region 112. For example, as shown in the enlarged area of FIG. 5, the screwing hole 115 may be formed to have two diameters, namely a large diameter portion for accommodating the screw head 116a and a small diameter portion for accommodating the screw portion 116b.

As the screwing hole 115 is provided in this way, it is possible to prevent the screw head 116a from protruding above the surface of the first length adjusting region 112 when the end of the screw portion 116b of the screw is completely fastened into the screwing groove 125. In this case, there are no protruding parts on both sides, different from the inter-bus bar 100 of the first embodiment. Therefore, when the inter-bus bar 100A is inserted into an insulation tube (not shown) or other insulating member to secure insulation, it is possible to prevent the opponent member from being damaged or, for example, torn.

In addition, when it is necessary to adjust the length of the inter-bus bar 100A shown in FIG. 5 longer, the first bus bar 110 and the second bus bar 120 are separated by loosening the screw 116, similar to the first embodiment described above. After that, as shown in FIG. 6, the relative positions of the first length adjusting region 112 and the second length adjusting region 122 are adjusted to align the screwing hole 115 and the screwing groove 125 again, and then the screw 116 is fastened therein.

Next, an inter-bus bar 100B according to the third embodiment of the present disclosure will be described.

Figure 7:
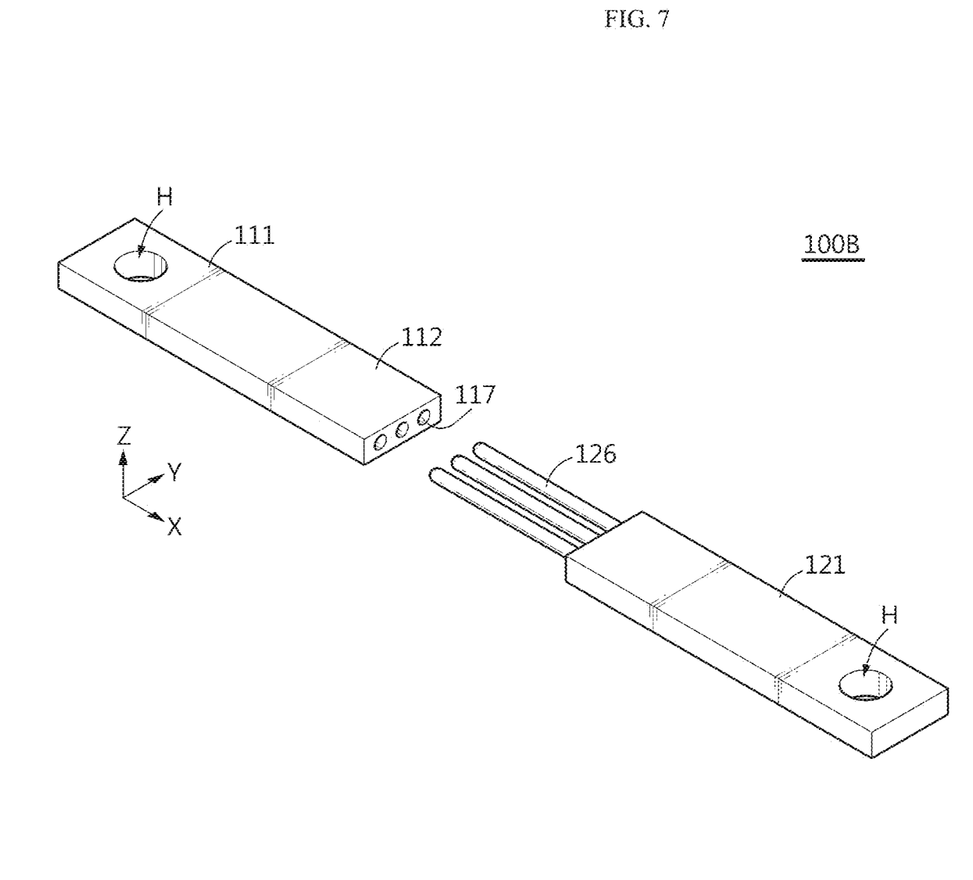
FIG. 7 is an exploded perspective view showing an inter-bus bar according to the third embodiment of the present disclosure.
Figure 8:
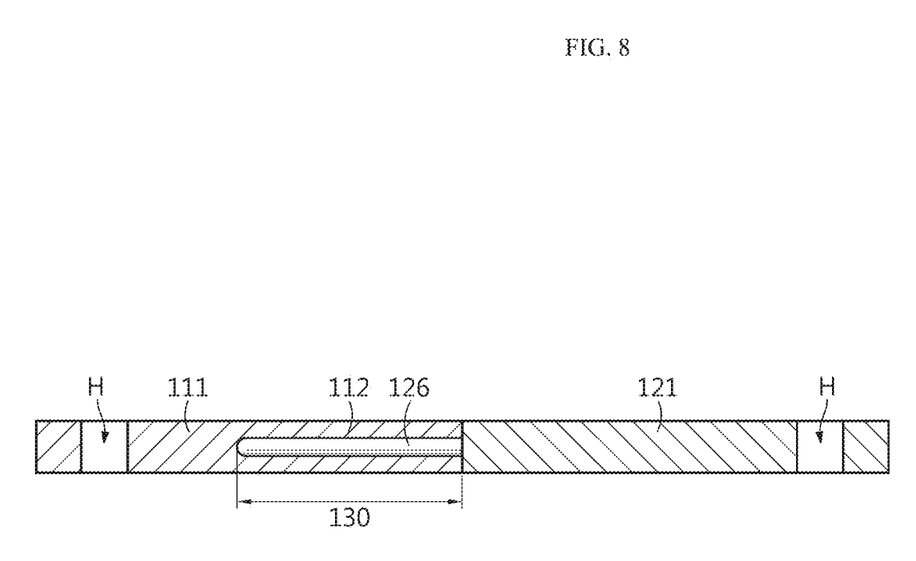
FIG. 8 is a sectional view showing the inter-bus bar according to the third embodiment of the present disclosure.
Figure 9:
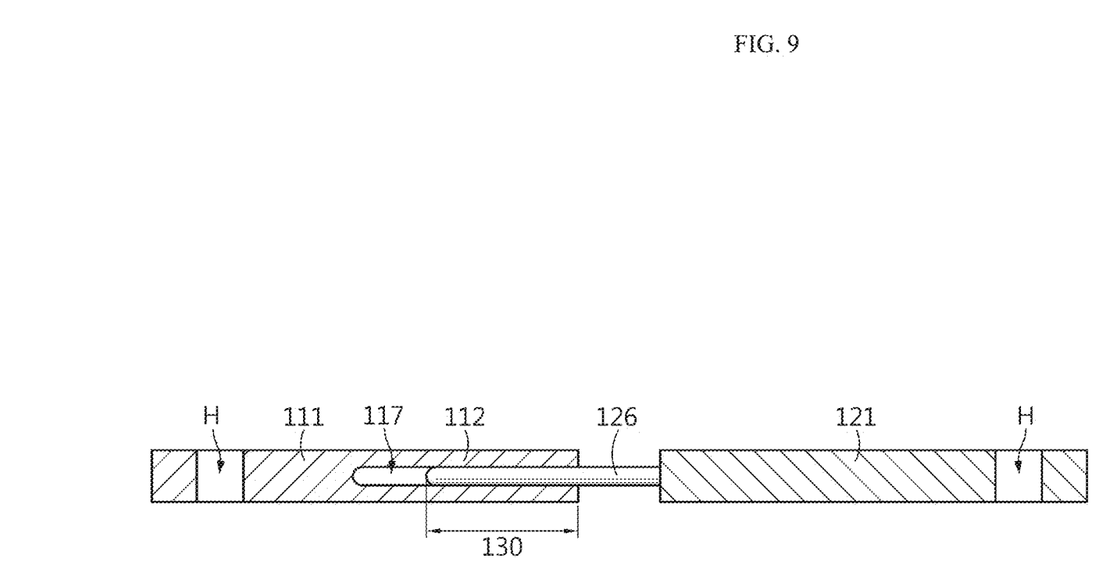
FIG. 9 is a sectional view corresponding to FIG. 8 and showing the inter-bus bar whose length is adjusted.

FIG. 7 is an exploded perspective view showing an inter-bus bar 100B according to the third embodiment of the present disclosure, FIG. 8 is a sectional view showing the inter-bus bar 100B according to the third embodiment of the present disclosure, and FIG. 9 is a sectional view corresponding to FIG. 8 and showing the inter-bus bar 100B whose length is adjusted.

The same reference numerals denote the same components, the same components will not be described again, and features different from the first and second embodiments described above will be described in detail.

Referring to FIGS. 7 to 9, the first length adjusting region 112 according to the third embodiment of the present disclosure is formed to have the same thickness as the first body region 111 and has an insert groove 117 depressed toward the first body region 111 to a predetermined depth from an end thereof, and a second length adjusting region 126 may have a length corresponding to the depth of the insert groove 117 and be configured to be connected into and released from the insert groove 117.

In the first embodiment described above, the length of the inter-bus bar 100 may be adjusted just in the unit of the interval of the keyholes 113, 123, and in the second embodiment described above, the length of the inter-bus bar 100 may be adjusted just in the unit of the screwing hole 115 or the screwing groove 125. However, in the inter-bus bar 100B according to the third embodiment, the second length adjusting region 126 is continuously inserted into or taken out from the insert groove 117 of the first length adjusting region 112 along the length (±X) direction, which allows more detailed length adjustment, compared to the first and second embodiments.

More specifically, the insert groove 117 may be provided in plural along the width direction of the first length adjusting region 112. Of course, depending on the thickness of the inter-bus bar 100, the insert groove 117 may be provided in two or more layers. To correspond to the insert grooves 117, the second length adjusting region 126 may be implemented to have a plurality of rod shapes to have one-to-one relationship with the insert grooves 117.

In this embodiment, three insert grooves 117 are formed and three rods are provided to form the second length adjusting region 126. However, unlike this embodiment, the insert grooves 117 and the rods may also be provided in the number of two or more than three.

According to the combination of the configuration of the plurality of insert grooves 117 and the second length adjusting region 126 having the plurality of rod shapes, as compared to the first and second embodiments, it is possible to adjust the length precisely and further improve the structural stability of the connection portion 130.

In addition, in the first and second embodiments described above, in order to adjust the length of the inter-bus bar 100 and 100A, the relative positions of the first bus bar 110 and the second bus bar 120 should be changed every time, and the keyhole 113, 123 and the fitting button 124 or the screw 116 should be fastened and released repeatedly. However, in the inter-bus bar 100B of the third embodiment, the second length adjusting region 126 of a rod shape is just inserted into or taken out of the insert groove 117 of the first length adjusting region 112, which allows very simple length adjustment.

In particular, the inter-bus bar 100, 100A of the first and second embodiments is mounted to the terminals of two battery modules after its length is completely adjusted. However, in the case of the inter-bus bar 100B of the third embodiment, without length adjustment, its one end may be mounted to the terminal of to any one battery module, and then, after extending its length as necessary, the other end thereof may be mounted to the terminal of the other battery module.

Since the inter-bus bar 100, 100A, 100B according to the present disclosure is configured to be length-adjustable as described above, battery modules may be easily connected even in places where the distance between the battery modules is not constant. Since the length of the inter-bus bar 100, 100A, 100B is adjusted in this way, one inter-bus bar 100, 100A, 100B may be used for several battery pack models with different specifications with compatibility, thereby improving the assembling convenience and economic feasibility of the battery pack.

Figure 10:
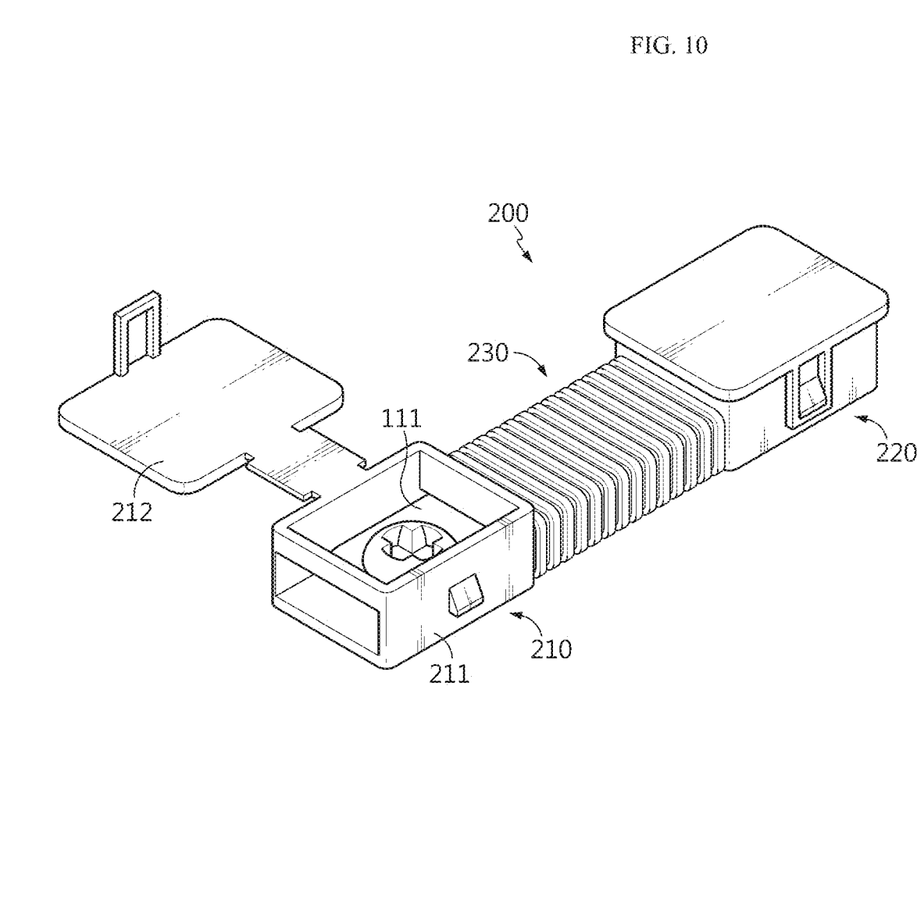
FIG. 10 is a perspective view showing a bus bar assembly according to an embodiment of the present disclosure.
Figure 11:
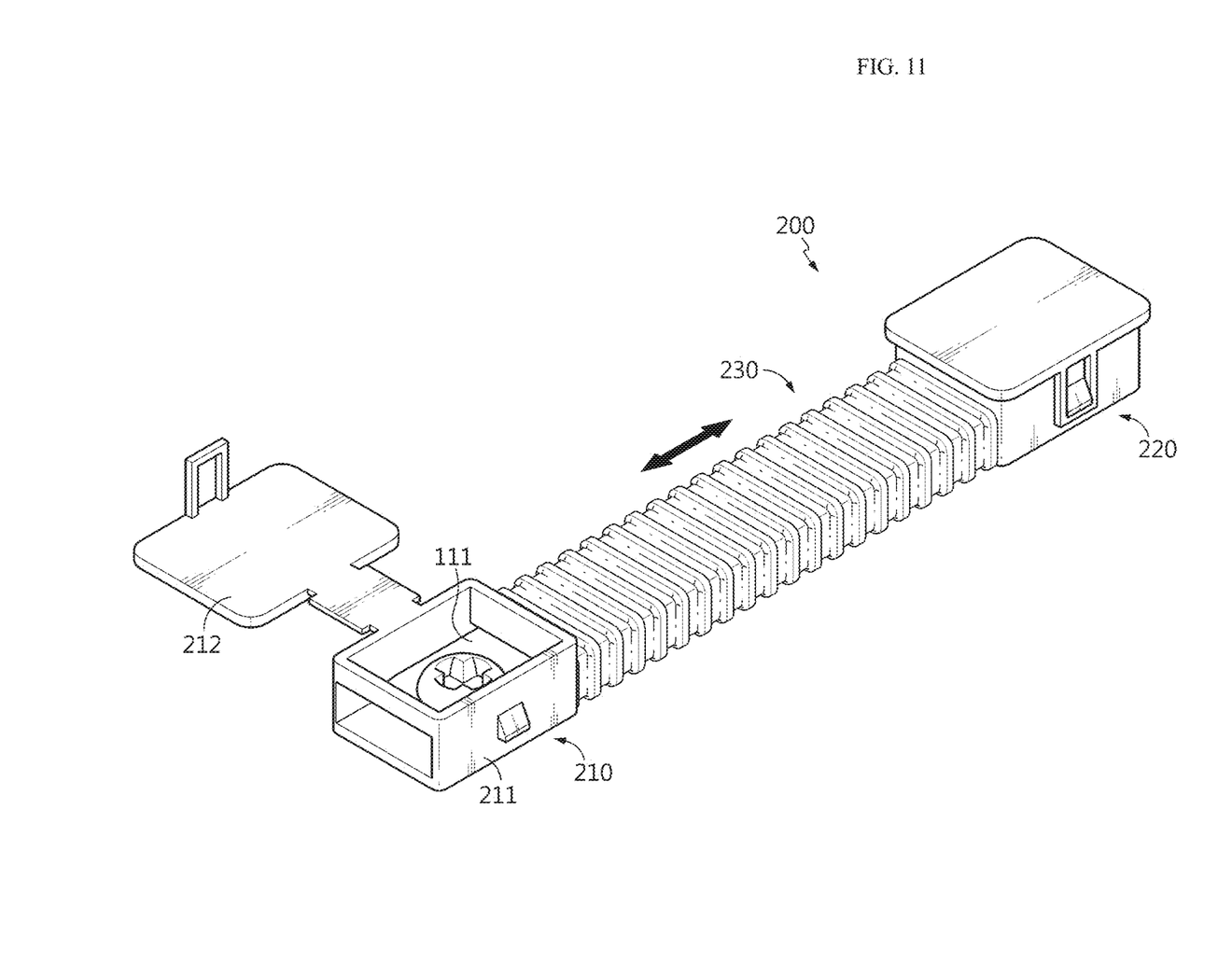
FIG. 11 is a perspective view showing an example where the bus bar assembly of FIG. 10 is used.

FIG. 10 is a perspective view showing a bus bar assembly according to an embodiment of the present disclosure, and FIG. 11 is a perspective view showing an example where the bus bar assembly 200 of FIG. 10 is used.

Next, a bus bar assembly 200 according to an embodiment of the present disclosure will be described with reference to the drawings. The bus bar assembly 200 according to an embodiment of the present disclosure includes the inter-bus bar 100 described above and an insulation covering unit 210, 220, 230 configured to surround and cover the inter-bus bar 100.

The insulation covering unit includes a first terminal cover 210 and a second terminal cover 220 respectively configured to open or shield the fastening hole H of the first bus bar 110 and the fastening hole H of the second bus bar 120, and a covering member 230 having one end coupled to the first terminal cover 210 and the other end coupled to the second terminal cover 220 and having a wrinkled structure with elasticity.

The first terminal cover 210 and the second terminal cover 220 may be plastic injection products, and the covering member 230 may be made of elastic silicone or rubber.

The first terminal cover 210 and the second terminal cover 220 may have the same shape, and each of them may include a cover body 211 for protecting one end of the first bus bar 110 and one end of the second bus bar 120, and an upper cover plate 212 provided to open and close an upper portion of the cover body 211 to facilitate bolt fastening.

The covering member 230 may be provided to have elasticity using a wrinkled structure corresponding to the length-adjustable inter-bus bar 100, 100A, 100B described above. In other words, the covering member 230 is capable of appropriately expanding and contracting the length of the inter-bus bar 100, 100A, 100B, which makes it possible to cover inter-bus bars of various lengths. Therefore, it is possible to eliminate the inconvenience and additional cost required for manufacturing an insulating material whenever the length of the inter-bus bar 100, 100A, 100B is changed.

Meanwhile, a battery pack according to the present disclosure may be configured to include the inter-bus bar 100, 100A, 100B described above, and battery modules electrically connected by the inter-bus bar 100, 100A, 100B.

The battery pack may further include various devices for controlling charging and discharging of each battery module, for example as a battery management system (BMS), a current sensor, a fuse and the like.

The battery pack may be applied to vehicles such as an electric vehicle or a hybrid electric vehicle. Also, the battery pack may be applied to energy storage systems or other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. An inter-bus bar comprising:
a first bus bar made of a conductive material, the conductive material extending from a first end of the first bus bar to a second end of the first bar, the first bus bar including a first body region and a first length adjusting region integral to the first body region, the first body region including a first fastening hole positioned at the first end of the first bus bar, the first length adjusting region extending along a first axis out from the first body region to the second end of the first bus bar by a first predetermined length; and
a second bus bar made of the conductive material, the conductive material extending from a first end of the second bus bar to a second end of the second bar, the second bus bar including a second body region and a second length adjusting region integral to the second body region, the second body region including a second fastening hole positioned at the first end of the second bus bar and a second length adjusting region extending along the first axis out from the second body region to the second end of the second bus bar by a second predetermined length, the second bus bar being removably couplable to the first bus bar,
wherein the first length adjusting region and the second length adjusting region are configured to be removably coupled to each other at different relative positions, wherein the first length adjusting region and the second length adjusting region are at least partially overlapped with each other when coupled, and wherein a length of the partial overlap between the first length adjusting region and the second length adjusting region is adjustable, and
wherein the inter-bus bar is configured to electrically connect two adjacent battery modules to each other.

2. The inter-bus bar according to claim 1,
wherein a thickness of the first length adjusting region is smaller than a thickness of the first body region, and a thickness of the second length adjusting region is smaller than a thickness of the second body region, and
a sum of the thicknesses of the first length adjusting region and the second length adjusting region is equal to at least one of the thickness of the first body region or the thickness of the second body region.

3. The inter-bus bar according to claim 1,
wherein the first length adjusting region and the second length adjusting region form a symmetric structure when coupled.

4. The inter-bus bar according to claim 1,
wherein the first length adjusting region includes:
a plurality of first holes formed through the first length adjusting region at predetermined intervals along the first axis; and
a first fitting button;
wherein the second length adjusting region includes:
a plurality of second holes formed through the second length adjusting region; and
a second fitting button,
wherein the first fitting button is adapted to fit into any one of the second plurality of holes, and wherein the second fitting button is adapted to fit into any one of the first plurality of holes.

5. The inter-bus bar according to claim 1,
wherein the first length adjusting region includes a plurality of holes positioned at predetermined intervals along the first axis, and
the second length adjusting region includes a plurality of depressions at positions corresponding to the plurality of holes in the first length adjusting region and depressed to a predetermined depth from a surface of the second length adjusting region, each of the depressions including a threaded inner circumference.

6. The inter-bus bar according to claim 5,
wherein the plurality of holes in the first length adjusting region have a first diameter adapted to fit a screw head of a screw, and the plurality of depressions in the second length adjusting region have a second diameter adapted to fit a threaded portion of the screw.

7. The inter-bus bar according to claim 1,
wherein the first length adjusting region and the first body region are equal in thickness, and the first length adjusting region includes one or more insert grooves depressed to a predetermined depth along the first axis from an end of the first length adjusting region toward the first body region, and
the second length adjusting region includes one or more extensions extending from the second body region along the first axis for a length corresponding to the predetermined depth of the insert groove, wherein the extension is adapted to be removably inserted into the insert groove.

8. The inter-bus bar according to claim 7,
wherein the first length adjusting region includes a plurality of insert grooves aligned along a width direction of the first length adjusting region, and
wherein the second length adjusting region includes a plurality of extensions, wherein each extension is a rod adapted to be removably inserted into a respective one of the plurality of insert grooves.

9. A bus bar assembly, comprising:
an inter-bus bar according to claim 1; and
an insulation cover configured to surround and cover the inter-bus bar.

10. A bus bar assembly comprising:
an inter-bus bar comprising:
a first bus bar including a first body region including a first fastening hole positioned at a first end of the first body region and a first length adjusting region extending along a first axis out from a second end of the first body region by a first predetermined length; and
a second bus bar including a second body region including a second fastening hole formed at a first end of the second busbar and a second length adjusting region extending along the first axis out from a second end of the second body region by a second predetermined length, the second bus bar being removably couplable to the first bus bar,
wherein the first length adjusting region and the second length adjusting region are configured to be removably coupled to each other at different relative positions, wherein the first length adjusting region and the second length adjusting region are at least partially overlapped with each other when coupled, and wherein a length of the partial overlap between the first length adjusting region and the second length adjusting region is adjustable, and
wherein the inter-bus bar is configured to electrically connect two adjacent battery modules to each other, and
an insulation cover configured to surround and cover the inter-bus bar, wherein the insulation cover includes:
a first terminal cover configured to removably cover the fastening hole of the first bus bar;
a second terminal cover configured to removably cover the fastening hole of the second bus bar; and
a middle cover portion including a first end coupled to the first terminal cover and a second end coupled to the second terminal cover, the middle cover portion is an accordion tube.

11. A battery pack, comprising:
an inter-bus bar according to claim 1; and
the two adjacent battery modules electrically connected by the inter-bus bar.

* * * * *